(12) United States Patent
Alam et al.

(10) Patent No.: US 10,576,429 B1
(45) Date of Patent: Mar. 3, 2020

(54) METHOD OF MAKING AN ASYMMETRIC POLYVINYLIDENE DIFLUORIDE MEMBRANE

(71) Applicant: KING SAUD UNIVERSITY, Riyadh (SA)

(72) Inventors: Javed Alam, Riyadh (SA); Arun Kumar Shukla, Riyadh (SA); Ali Kanakhir Aldalbahi, Riyadh (SA); Mansour Alhoshan, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/387,418

(22) Filed: Apr. 17, 2019

(51) Int. Cl.
*B01D 67/00* (2006.01)
*B01D 71/34* (2006.01)

(52) U.S. Cl.
CPC ...... *B01D 67/0013* (2013.01); *B01D 67/0011* (2013.01); *B01D 71/34* (2013.01); *B01D 2325/022* (2013.01); *B01D 2325/026* (2013.01)

(58) Field of Classification Search
None
See application file for complete search history.

(56) References Cited

U.S. PATENT DOCUMENTS

| | | | | |
|---|---|---|---|---|
| 6,110,309 | A * | 8/2000 | Wang | B01D 39/083 156/77 |
| 2006/0117999 | A1 | 6/2006 | Ghosh et al. | |
| 2009/0162662 | A1 * | 6/2009 | Chang | B01D 67/0023 428/421 |
| 2013/0256229 | A1 * | 10/2013 | Wang | B01D 67/0016 210/650 |
| 2016/0243505 | A1 | 8/2016 | Meena et al. | |
| 2018/0257043 | A1 | 9/2018 | Li et al. | |

FOREIGN PATENT DOCUMENTS

| | | |
|---|---|---|
| CN | 106848156 A | 6/2017 |
| CN | 107174969 A | 9/2017 |

OTHER PUBLICATIONS

"Poly(vinylidene fluoride) (PVDF) membranes for fluid separation"—Ji, Jing et al—Reactive and Functional Polymers 86, 2015 (Year : 2015).*
"Development of a nanocomposite ultrafiltration membrane based on polyphenylsulfone blended with graphene oxide"—Shukla, Arun Kumar et al—Scientific Reports, 2016 (Year: 2016).*
Wang et al., "Constructing a novel zwitterionic surface of PVDF membrane through the assembled chitosan and sodium alginate", Int J Biol Macromol (2016, 87:443-448.
Alam et al., "K-Carrageenan as a promising pore-former for the preparation of a highly porous polyphenylsulfone membrane", Materials Letters (2017) vol. 204, pp. 108-111.

\* cited by examiner

*Primary Examiner* — Bradley R Spies
(74) *Attorney, Agent, or Firm* — Richard C. Litman; Nath, Goldberg & Meyer

(57) ABSTRACT

Polyvinyl difluoride (PVDF) membranes prepared from casting solution including the biopolymer kappa-carrageenan (kCg) as an additive demonstrate improved structure and properties. The resulting asymmetrical structure has a thin layer on the upper surface, a porous sublayer with reduced volume of macro void space and increased porosity, and a spongy layer beneath the sublayer. This results in an increased hydrophilic nature, and provides enhanced wetting, membrane porosity, and water permeability—all important properties making these membranes suitable for a wide range of uses.

20 Claims, 5 Drawing Sheets

US 10,576,429 B1

METHOD OF MAKING AN ASYMMETRIC POLYVINYLIDENE DIFLUORIDE MEMBRANE

BACKGROUND

1. Field

The disclosure of the present patent application relates to polymer membranes used for water separation and the like, and particularly to a method of making an asymmetric polyvinylidene difluoride (PVDF) membrane.

2. Description of the Related Art

Polymeric membranes are important in the global membrane water separation industry, as they are very competitive in both performance and economics. They are generally prepared from aromatic sulfone-containing polymers (such as polysulfone and polyethersulfone), PVDF, cellulose acetate, and polyacrylonitrile. The most popular options are the sulfone polymers and PVDF.

We focus here on PVDF because of its excellent mechanical and thermal properties. PVDF polymers also tend to exhibit outstanding resistance to chlorine, acids and alkalis, and ultraviolet (UV) radiation, and exhibit chemical inertness across the entire pH range. These properties render the PVDF polymer suitable for production of micro and ultrafiltration membranes utilized in a wide range of separation applications.

The most widely used method for membrane fabrication, applied for PVDF membranes, is non-solvent-induced phase separation. This method involves solution casting and immersion into a coagulating bath containing non-solvents, such as water. In a phase inversion method, there are many parameters affecting membrane structure formation. The most significant parameters are the polymer concentration; the use of solution casting additives; the solvents and non-solvents used; the temperature; and the composition of the both coagulation bath and the casting solution.

Among these parameters, the solution casting additives play a particularly significant role in the formation of membrane structure. Different polymer additives, and different amounts of these additives, significantly affect the resulting membrane surface and cross-sectional morphology. Mostly, the effects on the morphology and permeation properties of the membranes tend to present a trade-off between thermodynamic enhancement and kinetic hindrance for solvent-nonsolvent exchange rate. This, in turn, affects the formation of the membrane structure, enlarging and tending to prevent macro voids, while improving formation of pores and pore interconnectivity.

Macro voids are large elongated pores (10-100 μm) that can extend through the membrane thickness. Macro voids, which are often found in the PVDF membranes prepared via phase-inversion techniques, are undesirable because they result in poor mechanical strength of the formed PVDF membrane. Macro void formation in PVDF membranes is caused by the low surface tension of the PVDF polymer, restricting penetration of the water (coagulant) into the casting solution during the phase inversion process. Thus, the coagulation rate and the rate of solidification of conventional PVDF casting solutions are both slow, contributing to formation of macro voids.

Common solution casting additives used previously include mineral fillers, inorganic salts, water soluble polymers, water (as a non-solvent), and co-solvents. Water-soluble polymers, such as polyvinylpyrrolidone (PVP) with a molecular weight (MW) range of 10-1300 kDa, and polyethylene glycol (PEG) with a MW range 0.2-20 kDa, have been frequently used due to their high affinity for the water molecules as well as good miscibility with membrane matrices.

Thus, a method of making an asymmetric polyvinylidene difluoride membrane solving the aforementioned problems is desired.

SUMMARY

The method of making an asymmetrical polyvinylidene difluoride membrane uses a phase inversion technique with a casting solution of 17 wt % polyvinylidene difluoride (PVDF), 81-82.5 wt % N-methyl-2-pyrrolidone (NMP) solvent, and between 0.5-2 wt % (preferably 1 wt %) kappa-carrageenan (kCg) as a casting solution additive, with deionized water as the coagulation bath. The resulting polyvinyl difluoride (PVDF) membrane has an asymmetric structure, including a thin layer on the upper surface, a porous sublayer with reduced volume of macro void space and increased porosity, and a spongy layer beneath the sublayer. The use of kCg also provides a membrane with increased surface hydrophilicity, increased porosity, and increased water permeability compared to PVDF membranes prepared without a casting solution additive.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
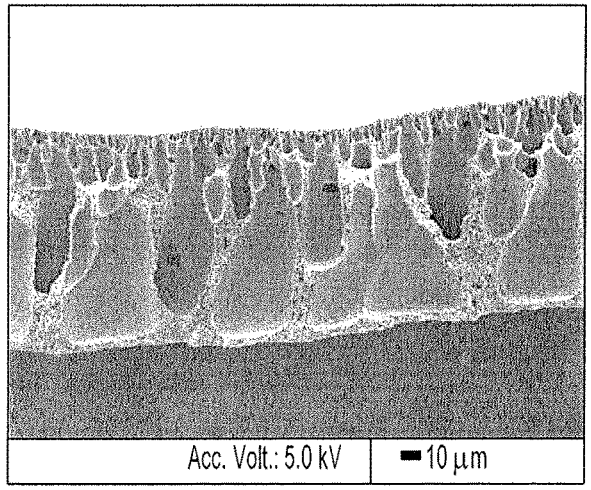
FIG. 1A is a scanning electron microscopy (SEM) micrograph showing a cross section of an asymmetric PVDF membrane prepared without casting solution additives.
Figure 1B:
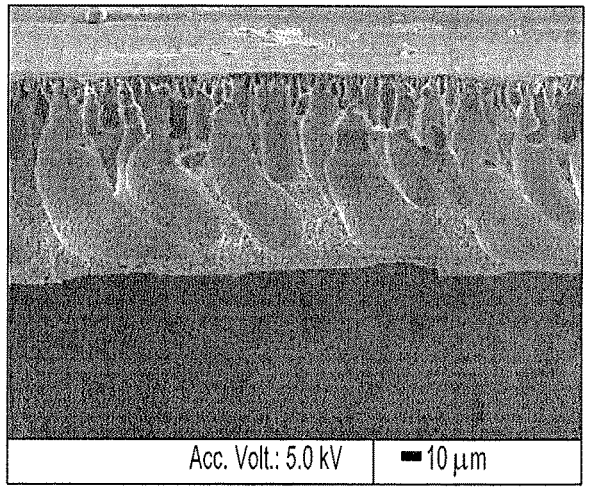
FIG. 1B is a SEM micrograph of an asymmetric PVDF membrane prepared with 0.5 wt % kappa-carrageenan (kCg).
Figure 1C:
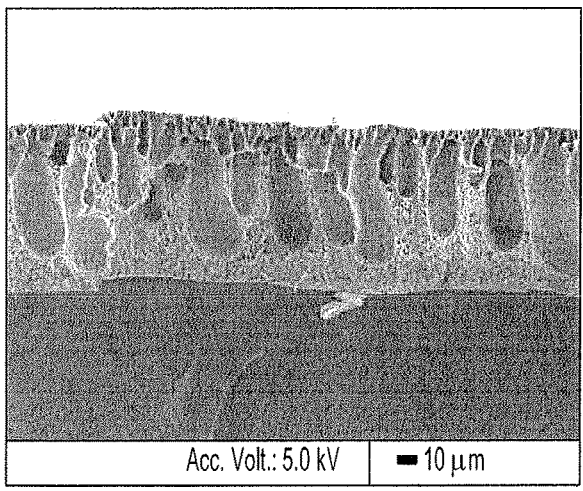
FIG. 1C is a SEM micrograph of an asymmetric PVDF membrane prepared with 1.0 wt % kCg.
Figure 1D:
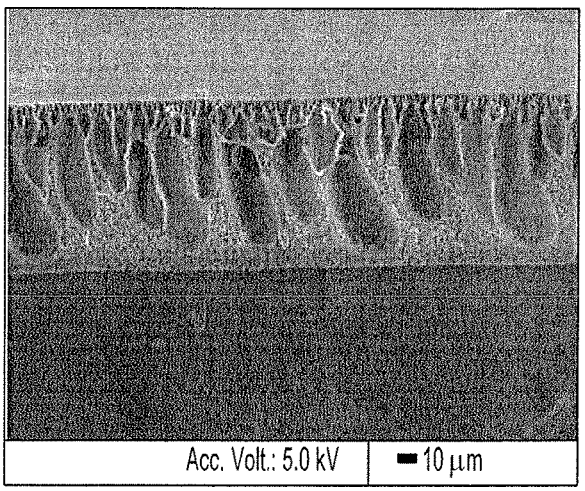
FIG. 1D is a SEM micrograph of an asymmetric PVDF membrane prepared with 2.0 wt % kCg.

The method of making an asymmetrical polyvinylidene difluoride membrane uses a phase inversion technique with a casting solution of 17 wt % polyvinylidene difluoride (PVDF), 81-82.5 wt % N-methyl-2-pyrrolidone (NMP) solvent, and between 0.5-2 wt % (preferably 1 wt %) kappa-carrageenan (kCg) as a casting solution additive, with deionized water as the coagulation bath. The resulting polyvinyl difluoride (PVDF) membrane has an asymmetric structure, including a thin layer on the upper surface, a porous sublayer with reduced volume of macro void space and increased porosity, and a spongy layer beneath the sublayer. The use of kCg also provides a membrane with increased surface hydrophilicity, increased porosity, and increased water permeability compared to PVDF membranes prepared without a casting solution additive.

The present method provides a biopolymer-based casting solution additive to develop PVDF membranes with high porosity, and that are asymmetric in structure. The use of kCg as a casting solution additive provides a unique combination of high water solubility, hydrophilicity, and excellent processability that result from its anionic structure. kCg contains galactose and 3,6-anhydrogalactose units, both sulfated and nonsulfated. The incorporation of a small amount of kCg (for example, 1.0 wt %) in the casting solution helped to construct PVDF membranes with typical asymmetric structure. The resulting PVDF membranes demonstrated reduced hydrophobicity (i.e., 30° decrease of water contact angle). Thus, kCg is a promising casting solution additive that warrants consideration as a commercial polymer additive for use in membrane manufacturing processes.

In the following examples, polyvinylidene difluoride [(PVDF-E 6020 P, molecular weight (MW)=58 000 g mol$^{-1}$] was supplied by Solvay polymer (USA). kCg, N-methyl-2-pyrrolidone (NMP), and sodium azide were purchased from Sigma Aldrich and used as received. Deionized water (Milli-Q), with a resistivity of 18.2 MΩ·cm, was used throughout the experiments.

Example 1

Synthesis of PVDF Membrane

A combination of solution blending and phase inversion was employed to fabricate the membranes. The PVDF and kCg polymers were first dried overnight in a vacuum oven at approximately 50° C. to remove moisture, and then dissolved in NMP by stirring continuously until a homogeneous solution, also called the casting solution, was achieved. The casting solutions were composed of PVDF 17 wt. %/kCg/NMP~82 wt. %, and kCg was used in 0.5%, 1.0%, and 2% weight ratios relative to the solvent. Prior to membrane casting, the prepared solutions were stirred gently and degassed for approximately 1 hour at room temperature. Each solution was then cast onto a glass plate using a hand-cast film applicator with an adjustable thickness. The films on the glass plate were immersed in the coagulation bath (deionized water), in which the exchange of the solvent in solution with the nonsolvent from the coagulation bath results in the phase separation. Subsequently, the membrane remained in the coagulation bath for 1 hour to allow the residual solvents to appear. The temperature of the casting solution and gelation bath was maintained at 25±2° C., and the relative humidity was maintained at 35±2%. The phase-inversed membranes were removed from the coagulation bath and washed thoroughly with deionized water, and then stored in 0.1% sodium azide solution in distilled water to prevent microbial contamination.

A variety of techniques are used to characterize the prepared PVDF membrane.

Example 2

Characterization of Membranes by SEM Microscopy

A JEOL (TESCAN, Czech Republic) scanning electron microscope (SEM) was used for the study of the surface and cross-sectional morphologies of the prepared membrane samples. In the SEM studies, the membrane samples were in the form of rectangular plates, each of size 4 mm×5 mm. For the SEM examinations, the samples were prepared by fracturing in liquid nitrogen, followed by gold-sputter coating. The voltage during the observation was set at 5 kV.

As can be seen in the SEM results, included in FIGS. 1A to 1D, the PVDF membrane without kCg addition (FIG. 1A) had a plurality of wide, bell-shaped voids, as well as open macro voids, that were unevenly distributed over the entire cross-sectional area, while the PVDF membrane prepared with various concentrations of kCg (0.5 wt %, 1.0 wt %, and 2.0 wt %) exhibited the morphology of asymmetric characteristics, comprising a top layer of the membrane. See FIGS. 1B to 1D, respectively. Below the top layer, the membranes prepared with kCg formed a porous sublayer with thumb-like pores, and a spongy bottom structure.

It is evident from the SEM results that the asymmetric characteristics of the PVDF membranes varied as a function of the amount of kCg additive in the casting solution. As shown, at a loading of kCg (0.5 wt. %), the macro voids were wider, and they spanned the entire cross section of the membrane, as clearly visualized in the SEM images. See FIG. 1B. Switching the kCg concentration from 0.5 wt. % to 1 wt. % enabled many significant changes in the cross-sectional structure, including the reduced growth rate of large and wide macro voids, and the formation of a transition layer underneath the top layer. See FIG. 1C. In addition, the membrane pores appeared to be open and well connected.

These morphological changes might be induced because of the faster exchange of the nonsolvent and solvent in the phase-inversion process, resulting from the hydrophilic nature of the kCg. Similar results with other hydrophilic polymeric membranes have been reported elsewhere. However, when the concentration of kCg was increased to 2.0 wt. %, the macro voids were observed to be large and wider shaped than those prepared from composite casting solutions of PVDF/kCg using the lower kCg concentrations. A less well-developed sponge structure at the bottom of the sublayer was also observed. This structure formation may be a consequence of the delayed demixing process caused by increased viscosity of the membrane casting solution.

Example 3

Wetting Characteristics of the Membranes

The contact angle measurement θ, which quantifies the hydrophilicity of a membrane surface, was assessed using a contact angle Attension T330 (Biolin Scientific). For the measurement, each freshly prepared membrane was dried in a vacuum oven at 40° C. for 1 h, after which the sessile drop method was used to measure the contact angle of a water droplet deposited on a membrane surface.

With this method, a water droplet (3 μl) is introduced on the membrane surface, and the image profile of a water drop deposited on a horizontally positioned surface of the membrane is recorded by a camera that is fitted with the contact angle instrument. All the reported contact-angle data were an average of five measurements on different points of each membrane surface.

Figure 2:
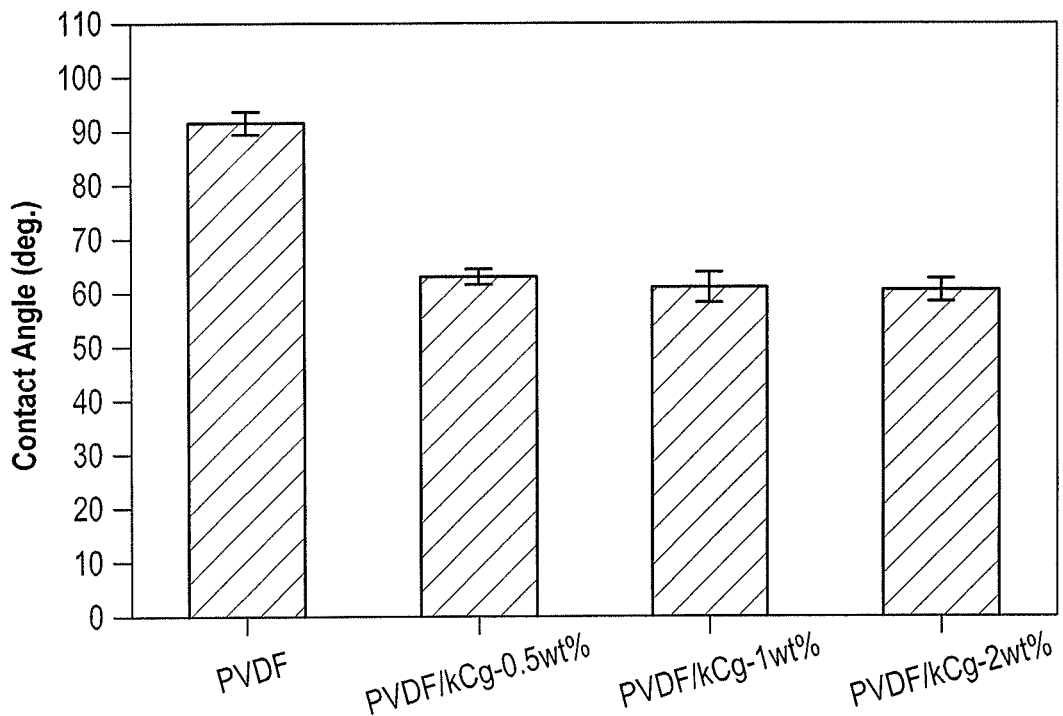
FIG. 2 is a chart comparing the contact angles of PVDF membranes prepared using 0%, 0.5 wt %, 1.0 wt %, and 2.0 wt % kCg.

As depicted in FIG. 2, comparing the contact angle θ for each sample, the PVDF membranes prepared with the addition of kCg exhibited a dramatic change in their wetting behavior, as evidenced by the change of contact angle. For the PVDF membrane prepared without kCg, the θ value was 91±2°, while the PVDF membranes formed with the addition of kCg, demonstrated a reduced contact angle value of about 60±2° to 61±2°, meaning that the PVDF membranes of the present method are hydrophilic in nature. Thus, the addition of kCg in the preparation process for the membranes improved the surface hydrophilicity of the resulting PVDF membranes. This may be due to the kCg hydrophilic nature resulting from the several polar groups of the kCg polymer. In addition, the increased wetting behavior of the PVDF membrane surface created using kCg may have contributed to the effect of increased porosity.

Example 4

Characterization of Membrane Porosity

Membrane porosity (ε) plays a paramount role in determining the water permeability of a membrane. The results demonstrate that the addition of kCg to the PVDF process is beneficial to the resulting PVDF membrane, producing a more porous structure.

The porosity (ε) of each developed PVDF membrane was measured by the gravimetric method based on the water sorption process, and it is calculated using the equation:

$$\varepsilon(\%) = \frac{W_w - W_d}{\rho \cdot A \cdot l} \times 100,$$

where $W_w$: weight of the wet membrane, $W_d$: weight of the dry membrane, A: membrane effective area (m$^2$), ρ: water density (0.998 gcm$^{-3}$) and l: membrane thickness (m).

Figure 3:
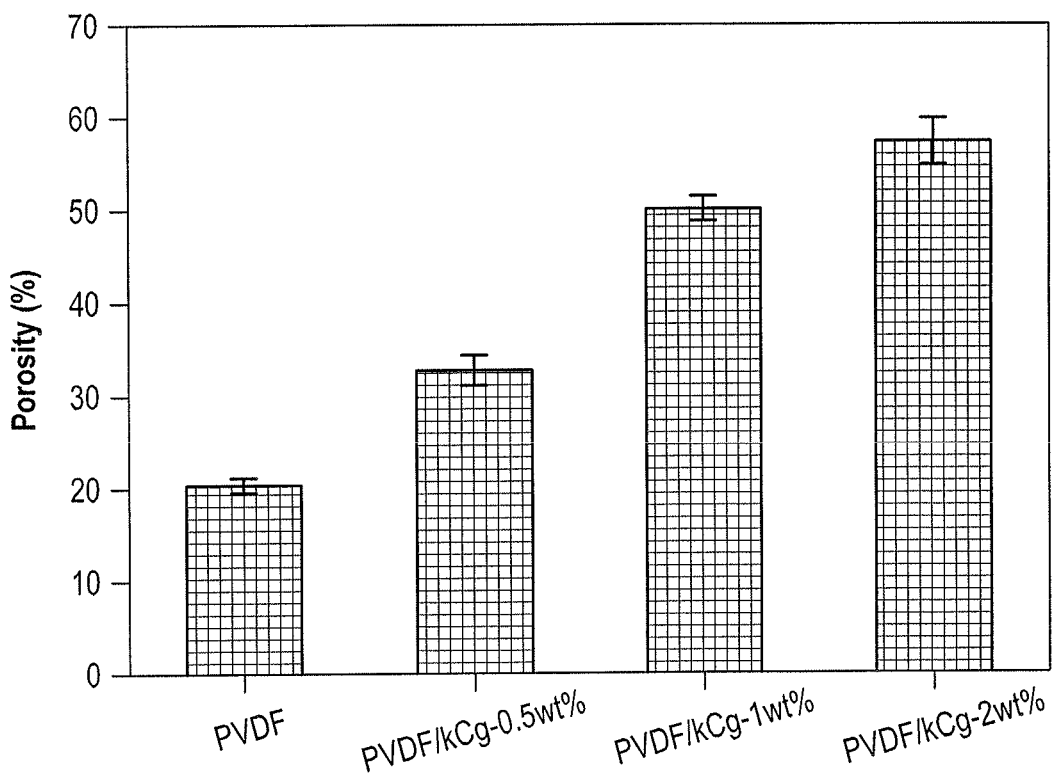
FIG. 3 is a chart comparing the membrane porosity for PVDF membranes prepared using 0%, 0.5 wt %, 1.0 wt %, and 2.0 wt % kCg.

As reflected in FIG. 3, the results indicate that the addition of kCg to the PVDF matrix significantly improved membrane porosity. Membrane porosity increased from 20% without kCg, to as much as 57% with kCg amounts from 0.5% to 2%. The porosity reached about 33% when the kCg content was 0.5 wt %; 50% when the kCg content was 1.0 wt %; and 57% when the kCg content was 2.0 wt %. The thermodynamic instability induced by the addition of the hydrophilic kCg may lead to an enhanced phase separation, which, in turn, increases porosity of the resulting PVDF membrane.

The penetration of the nonsolvent into the chain spaces increases the instantaneous demixing in the coagulation bath during phase inversion and consequently forms the membranes with higher porosity. Hydrophilic additives are known for their ability to form pores, and micro- and macro voids in the membrane.

Example 5

Characterization of Membrane Water Permeability

The experiments for membrane water permeability were carried out at room temperature, and transmembrane pressures (TMPs) of 1-4 bar using a cross-flow filtration setup with an effective membrane surface area of 42 cm$^2$ in the batch mode. The water permeability ($W_p$) was determined from the dope of the linear relationship between the water flux ($J_v$) and TMP (ΔP), and was calculated by the equation:

$$W_p = \frac{J_v}{\Delta P}.$$

Figure 4:
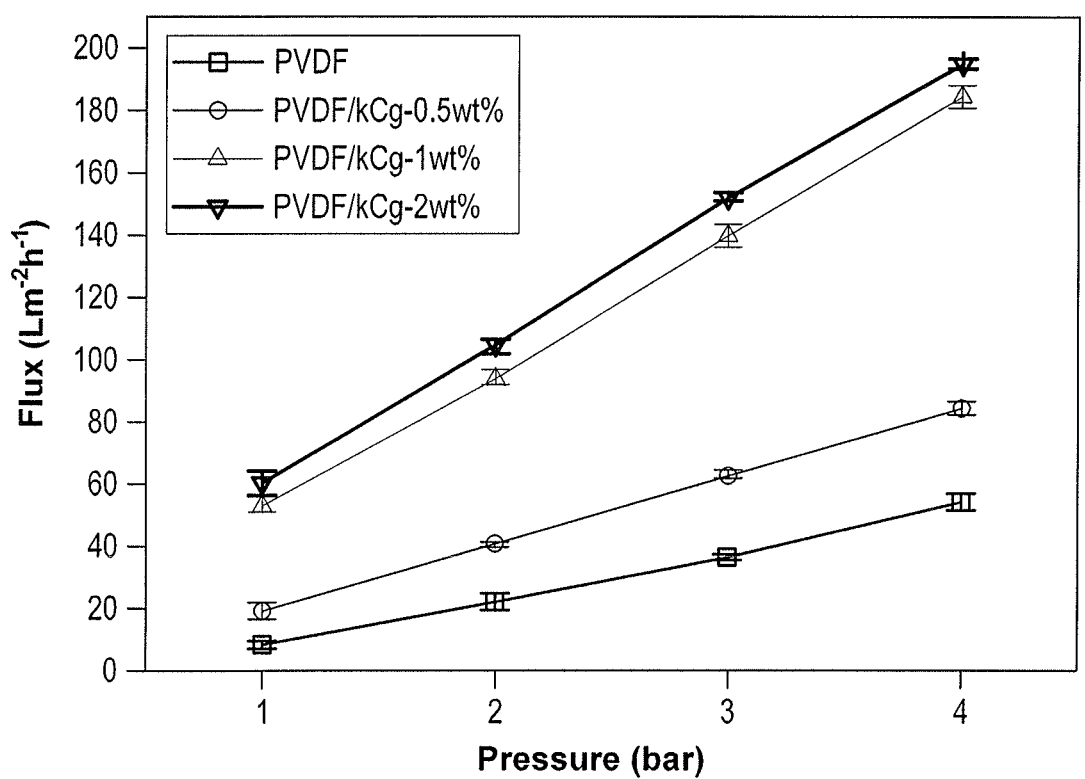
FIG. 4 is a plot comparing the water permeability of PVDF membranes prepared using 0%, 0.5 wt %, 1.0 wt %, and 2.0 wt % kCg.

The water permeability results for the prepared membranes are depicted in FIG. 4. The PVDF membranes prepared with kCg showed better permeability, probably because of the significantly greater hydrophilic nature of the composite membranes, even at a very low concentration of kCg.

Figure 5:
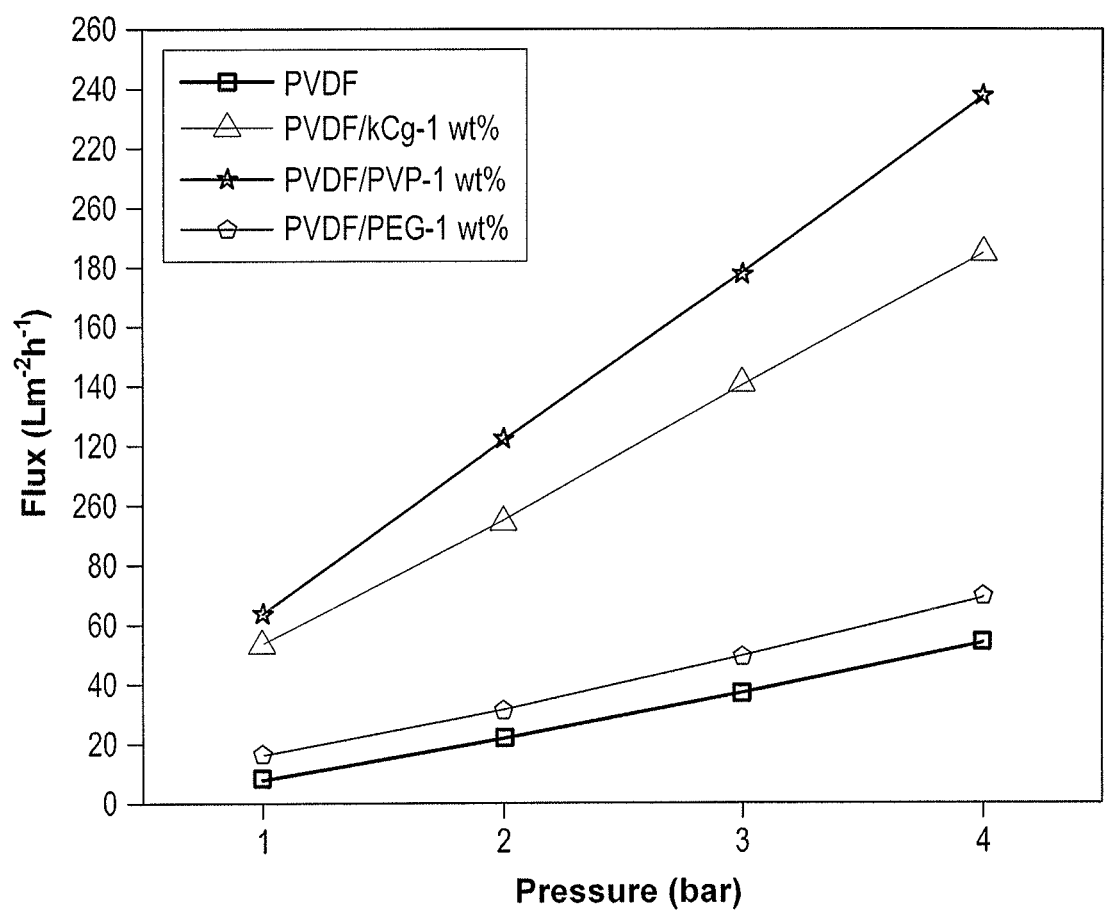
FIG. 5 is a plot comparing water flux of PVDF membranes prepared using 0% and 1 wt % k Cg with PVDF membranes prepared using 1 wt % PVP and 1 wt % PEG as solution casting additive.

As reflected in FIG. 4, the membranes prepared with casting solution PVDF/kCg had a water permeability averaging about 46 Lm$^{-2}$h$^{-1}$bar$^{-1}$—approximately a four-fold increase over water permeability for the pure PVDF membrane without kCg. The better performance was attributed to the fact that the PVDF/kCg membranes were hydrophilic, as confirmed by the contact angle results, and showed a more porous top surface than the PVDF membrane, as clearly shown in the SEM images, FIGS. 1A-1D. The increased porosity, as reflected in FIG. 3, was also a significant factor leading to higher water permeability of the PVDF/kCg membranes. Also, as shown in FIG. 5, the PVDF membranes prepared with the 1 wt % kCg casting solution had significantly greater water flux than PVDF membranes made without kCg or PVDF membranes made with PEG casting solution additive, though somewhat less water flux than PVDF membranes made with 1 wt % PVP casting solution additive, showing the asymmetric nature of the membrane.

Example 6

Membrane Strength

Figure 6:
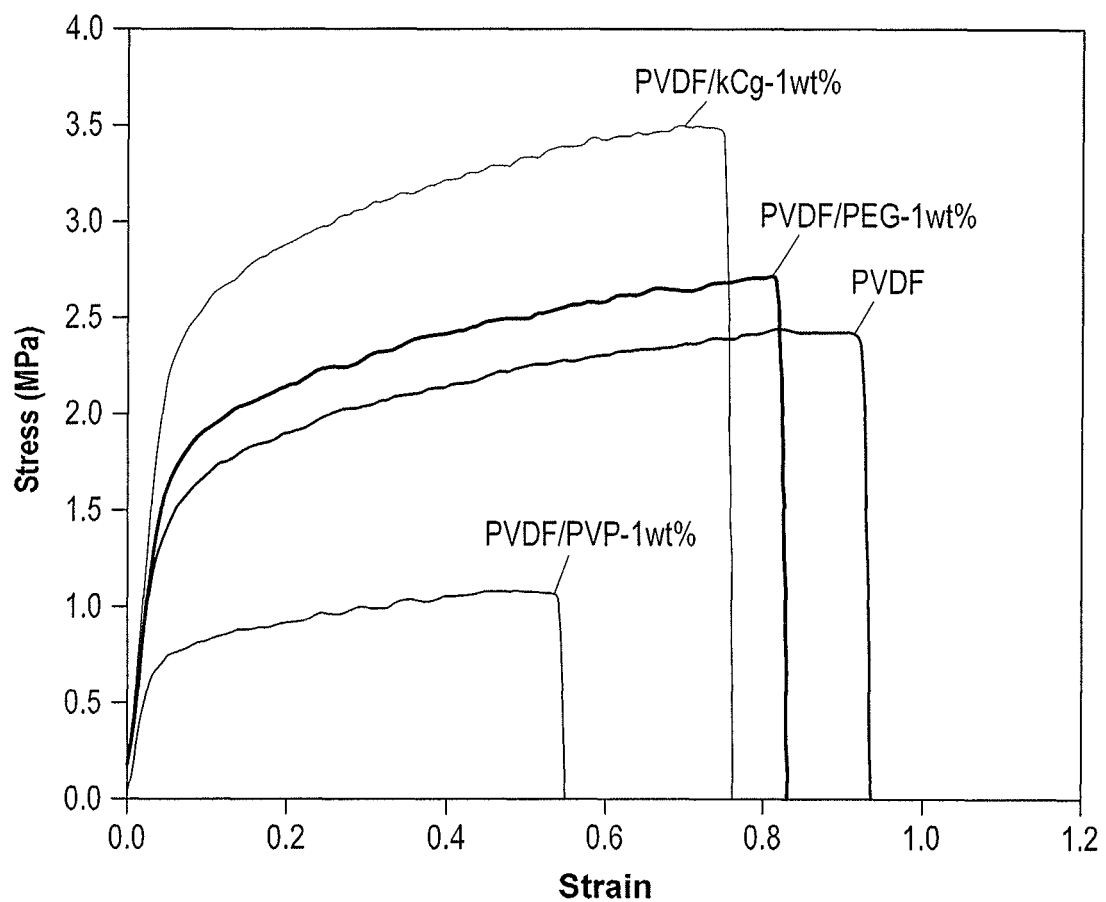
FIG. 6 is a plot comparing tensile strength of PVDF membranes prepared using 0% and 1 wt % k Cg with PVDF membranes prepared using 1 wt % PVP and 1 wt % PEG as solution casting additive.

The strength of PVDF membranes made with wt % kCg in the casting solution was compared with the strength of PVDF membranes made without a casting solution additive and with the strength of PVDF membranes made with 1 wt % PVP casting solution and 1 wt % PEG in the casting solution. As shown in FIG. 6, the PVDF membrane made with kCg in the casting solution exhibited superior tensile strength both to the membranes made with no casting solution additive and to the membranes made with either PVP or PEG as the casting solution additive. The greater strength of the PVDF membrane made with kCg casting solution additive is ascribed to the reduced macro void space when using kCg as the casting solution additive.

The PVDF membranes prepared using kCg in the casting solution resulted in significant improvements in hydrophilicity, porosity and water permeability, while reducing macro void space in the porous sublayer, thereby strengthening the membrane using a smaller quantity of casting solution additives than conventional methods of preparing PVDF membranes. The resulting polymers possess excellent mechanical and thermal properties, outstanding resistance to chlorine, acids and bases, and ultraviolet exposure, as well as chemical inertness across a wide pH range. Accordingly, these eco-friendly membranes are suitable for micro- and ultra-filtration membranes, useful for a wide range of applications.

It is to be understood that the method of making an asymmetric polyvinylidene difluoride membrane is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making an asymmetric polyvinylidene difluoride (PVDF) membrane, comprising the steps of:
dissolving PVDF and kappa-carrageenan (kCg) polymers in a solvent to form a casting solution;
casting the solution onto a plate, whereby a film is formed on the plate; and
immersing the film on the plate in a coagulation bath to form the membrane.

2. The method of making an asymmetric polyvinylidene difluoride (PVDF) membrane according to claim 1, wherein the solvent comprises N-methyl-2-pyrrolidone (NMP).

3. The method of making an asymmetric polyvinylidene difluoride (PVDF) membrane of claim 1, further comprising the step of drying the PVDF and kCg overnight in a vacuum oven at about 50° C. prior to said dissolving step.

4. The method of making an asymmetric polyvinylidene difluoride (PVDF) membrane of claim 1, wherein said dissolving step further comprises stirring the polymers and solvent continuously until the casting solution is formed.

5. The method of making an asymmetric polyvinylidene difluoride (PVDF) membrane of claim 1, wherein the kCg comprises between 0.5 to 2.0 wt % of said casting solution.

6. The method of making an asymmetric polyvinylidene difluoride (PVDF) membrane of claim 1, wherein the kCg comprises 1.0 wt % of said casting solution.

7. The method of making an asymmetric polyvinylidene difluoride (PVDF) membrane of claim 1, wherein the plate is a glass plate.

8. The method of making an asymmetric polyvinylidene difluoride (PVDF) membrane of claim 1, further comprising the step of maintaining the casting solution and the coagulation bath at 25° C. and 35% humidity.

9. The method of making an asymmetric polyvinylidene difluoride (PVDF) membrane of claim 1, further comprising the steps of washing the membrane with deionized water and storing the membrane in 0.1% sodium azide solution in distilled water.

10. The method of making an asymmetric polyvinylidene difluoride (PVDF) membrane according to claim 1, wherein said coagulation bath comprises deionized water.

11. The method of making an asymmetric polyvinylidene difluoride (PVDF) membrane according to claim 1, wherein said PVDF comprises 17 wt % of said casting solution and said kCg comprises 1 wt % of said casting solution, the balance being solvent.

12. A polyvinylidene difluoride (PVDF) membrane casting solution comprising PVDF and kappa-carrageenan (kCg).

13. The polyvinylidene difluoride (PVDF) membrane casting solution of claim 12, wherein the kCg comprises 0.5 to 2.0 wt % of said casting solution.

14. The polyvinylidene difluoride (PVDF) membrane casting solution of claim 12, wherein the kCg comprises 1.0 wt % of said casting solution.

15. The polyvinylidene difluoride (PVDF) membrane casting solution of claim 12, consisting essentially of:
17 wt % PVDF; and
1 wt % kappa-carrageenan, the balance being solvent.

16. The polyvinylidene difluoride (PVDF) membrane casting solution of claim 15, wherein said solvent is N-methyl-2-pyrrolidone (NMP).

17. A PVDF membrane prepared from the PVDF casting solution of claim 16.

18. The PVDF membrane of claim 17, wherein the membrane is asymmetric, having a thin top layer, a thick porous sublayer, and a spongy bottom layer.

19. A PVDF membrane prepared from the PVDF casting solution of claim 15.

20. The PVDF membrane of claim 19, wherein the membrane is asymmetric, having a thin top layer, a thick porous sublayer, and a spongy bottom layer.

* * * * *